Nov. 29, 1966 A. M. HITCHCOCK ET AL 3,288,459

DOCUMENT FEEDING APPARATUS

Filed March 1, 1965 4 Sheets-Sheet 1

INVENTORS
ALLEN M. HITCHCOCK
ROBERT W. THOMPSON

BY

ATTORNEYS

Nov. 29, 1966 A. M. HITCHCOCK ET AL 3,288,459

DOCUMENT FEEDING APPARATUS

Filed March 1, 1965 4 Sheets-Sheet 2

INVENTORS
ALLEN M. HITCHCOCK
ROBERT W. THOMPSON
BY
ATTORNEYS

Nov. 29, 1966

A. M. HITCHCOCK ET AL 3,288,459

DOCUMENT FEEDING APPARATUS

Filed March 1, 1965

4 Sheets-Sheet 3

INVENTORS
ALLEN M. HITCHCOCK
ROBERT W. THOMPSON

BY

ATTORNEYS

Nov. 29, 1966 A. M. HITCHCOCK ET AL 3,288,459

DOCUMENT FEEDING APPARATUS

Filed March 1, 1965 4 Sheets-Sheet 4

INVENTORS
ALLEN M. HITCHCOCK
ROBERT W. THOMPSON
BY [signature]
[signature]
ATTORNEYS United States Patent Office 3,288,459
Patented Nov. 29, 1966

3,288,459

DOCUMENT FEEDING APPARATUS

Allen M. Hitchcock, Palmyra, and Robert W. Thompson, Penfield, N.Y., assignors to Xerox Corporation, Rochester, N.Y., a corporation of New York Filed Mar. 1, 1965, Ser. No. 435,942
4 Claims. (Cl. 271—10)

This invention relates to document feeding apparatus and particularly to apparatus to feed a plurality of aligned documents to a moving conveyor.

In automatic reproducing machines the document to be reproduced and a photosensitive surface are synchronously moved past a scanning station and an exposure station, respectively. Incremental areas of the document are scanned at the scanning station and transmitted to the exposure station to expose the photosensitive surface. The document and the photosensitive surface are moved in timed relation so that the incremental areas scanned on the document appear in the proper relation on the photosensitive surface. Movement of the document past the scanning station is usually accomplished by a continuous belt conveyor system. Documents are fed or placed on the conveyor belts by an operator or an automatic sheet feeder so that the document is positioned relative to the scanning station. However, when reduced images are placed on data processing cards, the images must appear on the cards within close tolerances and thus, the documents must be accurately aligned and timed at the scanning station. Also in order to reproduce more than one document at a time, it is necessary that the documents be placed on the conveyor belts simultaneously and in proper alignment relative to the scanning station and to each other. It is not practical for an operator to attempt to feed more than one properly aligned document. Applicant's invention provides a novel means for aligning a plurality of documents relative to each other and to a scanning station and for feeding the documents simultaneously to a moving conveyor system so that the documents may be carried past a scanning station in proper alignment.

The increase in copying and storing of records in modern business has necessitated reproduction and filing systems that incorporate a multiplicity of documents on single cards or other reproducible mediums. In order to use the cards or other reproducible mediums, the images on the card must be properly aligned to ensure proper alignment of subsequent reproductions made from the cards. Therefore, it is encumbent upon the original apparatus used to copy the documents onto the card or other medium to properly align the images of the document on the card.

It is therefore the primary object of this invention to improve document feeding apparatus to accommodate the simultaneous feeding of a plurality of properly aligned documents to a document scanning system.

It is also an object of this invention to facilitate the feeding of documents to a moving conveyor system.

It is also an object of this invention to facilitate the alignment and feeding of a plurality of documents to a moving conveyor system.

It is also an object of this invention to provide apparatus to enable an operator of a document reproducing machine to feed a multiplicity of properly aligned documents simultaneously to a document conveyor for movement past a scanning station.

These and other objects of this invention are attained by means of a document tray capable of containing a plurality of documents and having means to align the documents relative to each other and also having means to transfer the documents from the tray to a conveyor system in proper alignment.

For a better understanding of the invention as well as other objects and further features thereof, reference is had to the following detailed description of the invention to be read in connection with the accompanying drawings, wherein.

Figure 1:
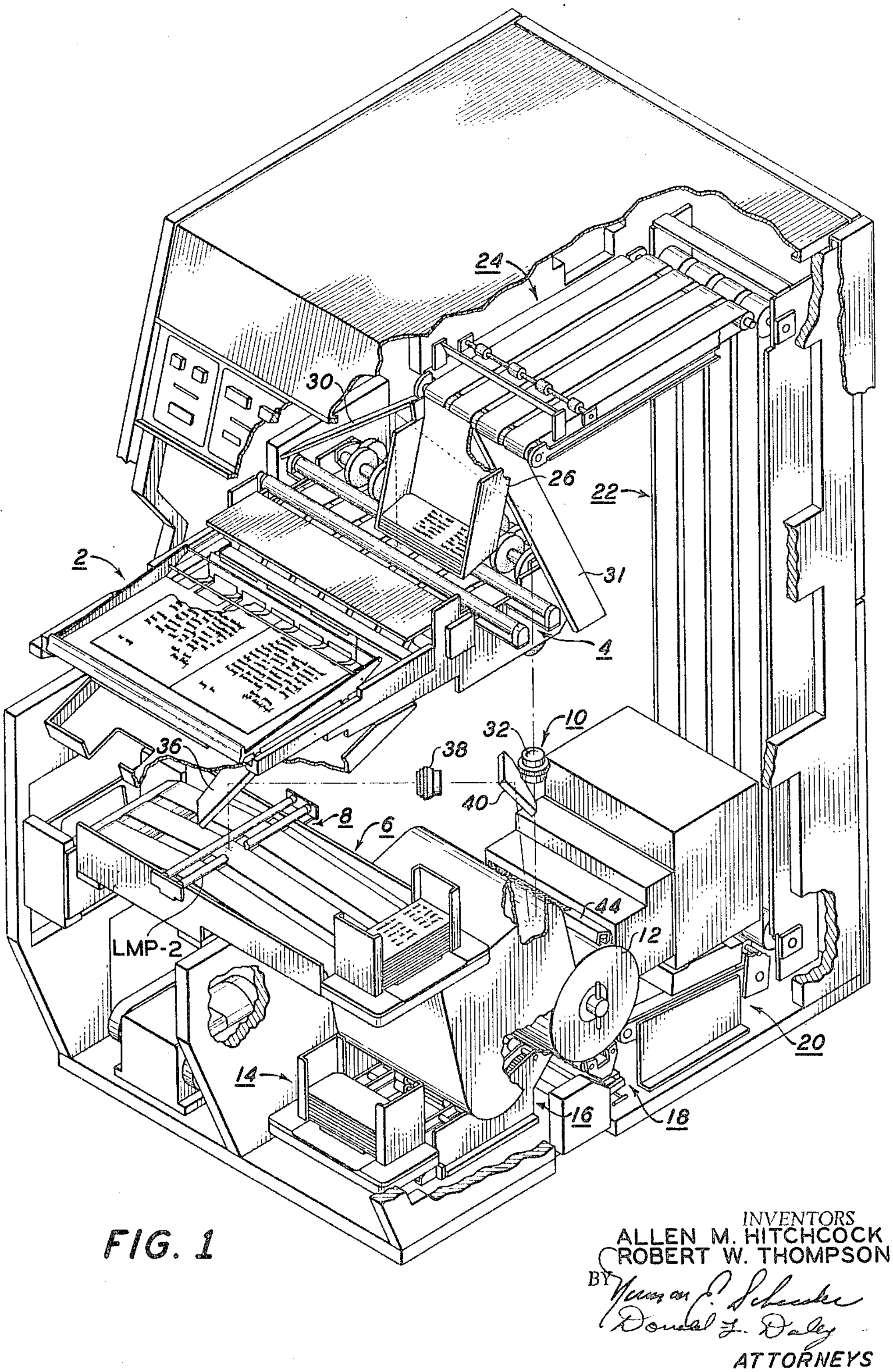
FIG. 1 is an isometric view of a xerographic machine incorporating the present invention, with parts broken away to show internal construction.
Figure 2:
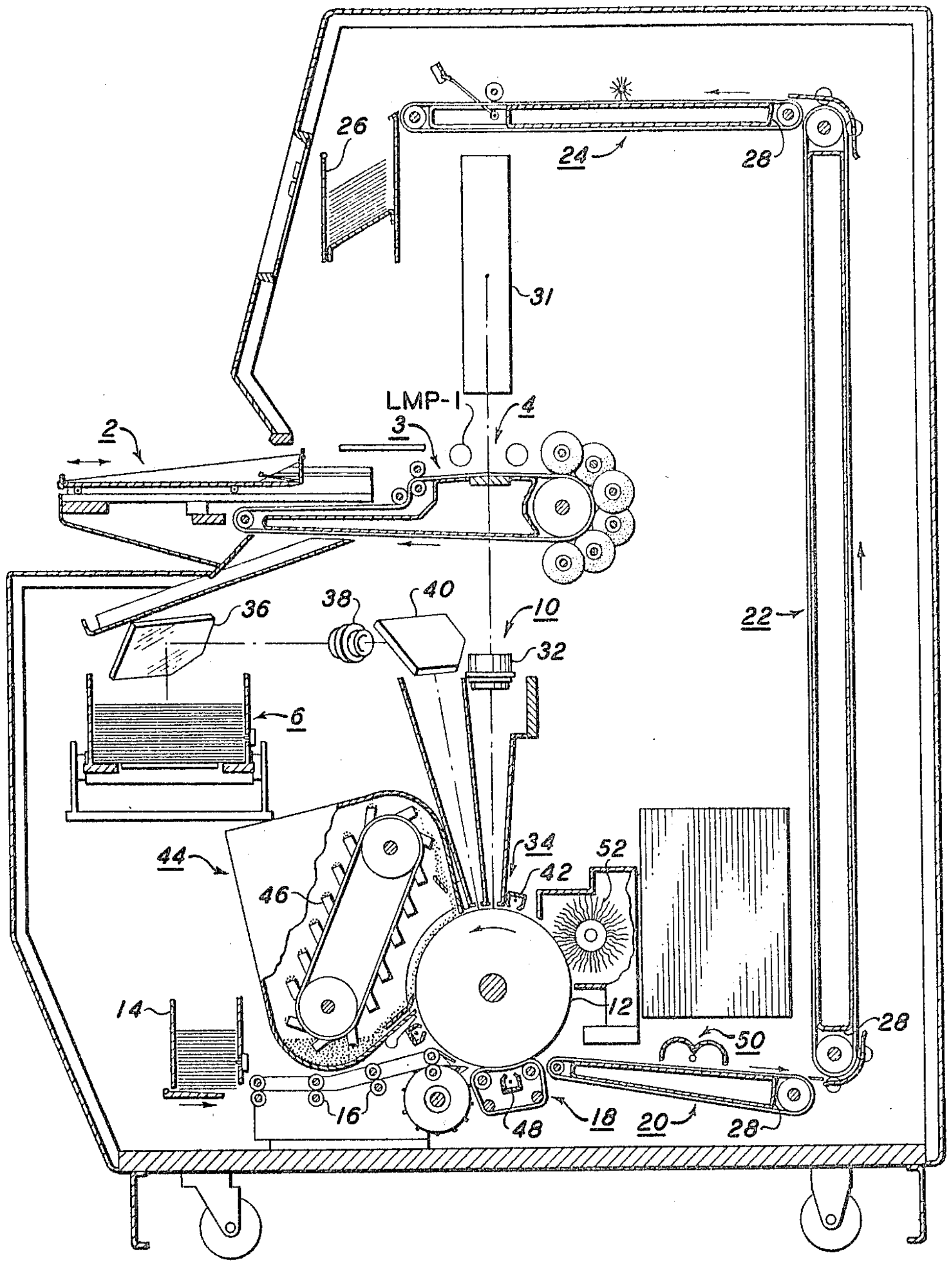
FIG. 2 is a schematic side view of the machine shown in FIG. 1.

The machine shown in FIGS. 1 and 2 is used to xerographically reproduce reduced images of documents onto data processing cards or the like. A document tray, generally designated 2 and described in detail below, feeds original documents to a document conveyor 3 and a document scanning station 4. A card conveyor, generally designated 6, is used to transport cards containing images thereon past a card scanning station 8. Light images of material to be reproduced are directed from the scanning stations 4 and 8 through an optical system, generally designated 10, to a xerographic drum 12. Blank data processing cards or the like are fed from a card hopper 14 to a conveyor 16 and into contact with the xerographic drum 12 at a transfer station 18. Xerographic powder images of the copy being reproduced are transferred to the surface of the card at transfer station 18 and the card is removed from the drum and deposited on a card conveyor system 20. The card is transferred from the conveyor 20 to a second conveyor 22 which carries the card to the top of the machine and transfers it to a third conveyor 24. The conveyor 24 deposits the card in a card receiving hopper 26 where it may be removed by a machine operator. The conveyors 20, 22 and 24 are vacuum type conveyors wherein a vacuum manifold 28 is positioned beneath the surface of the belts in each conveyor and has a series of openings in the top through which air is drawn when the manifold is connected to a suitable vacuum source not shown. Perforations in the belts of the conveyor allow air to be drawn through the perforations into the manifold, and the section produced holds the card on the conveyor system for transport therewith.

Original documents are carried by the conveyor 3 past the scanning station 4 at which point incremental areas of the material on the documents are illuminated by a pair of lamps LMP–1. Optical images of the illuminated area are reflected by a mirror 30 to a second mirror 31 then downwards through a lens 32 onto the surface of the xerographic drum 12 at an exposure station 34. The optical system 32 reduces the size of the visual material on the documents being scanned to a size sufficient for the entire document to appear on the surface of the data processing card or the like. If a new set of cards are being produced from cards, then the optical system associated with the conveyor 6 in the scanning station 8 is used and the optical image produced by a pair of lamps LMP–2 at the scanning station reflects images upward into a mirror 36 to a lens 38 to a second mirror 40 where it is directed downward onto the surface of the xerographic drum at the exposure station 34.

Images are produced on the xerographic drum by placing an electrostatic charge on the drum surface with a corotron 42, then exposing the drum surface to light images of the copy being reproduced at the exposure station 34 and rotating the drum past a developer station 44. In automatic xerographic machines a rotating drum having a photoconductive material on the surface thereof is used to create and develop electrostatic images of copy being reproduced. A uniform electrostatic charge is placed on the surface of the photoconductor while the photoconductor is in the dark. At the exposure station the photoconductive surface with the electrostatic charge thereon is exposed to a light image of the copy to be reproduced, and the photoconductor is rendered conductive in areas where it is exposed to light and thus the charge is drained off in those areas exposed to light. The areas which are not exposed to light are the image areas of the original document and retain their electrostatic charge in image configuration. The electrostatic charge in image configuration is developed with a finely divided powder material referred to herein as toner to produce a powder image. As shown at station 44, a continuous bucket type conveyor 46 carries a developer material consisting of glass beads or carrier particles and toner material to a position where it is cascaded over the drum surface. The toner on the carrier beads is attracted by the electrostatic charge on the xerographic drum and is retained there to produce a powder image. The drum continues to rotate to the transfer station 18 wherein the powder image is transferred from the drum surface to the surface of the support material, such as the data processing cards, by means of a transfer corotron 48. The transfer corotron 48 places an electrostatic charge on the back of the support material and attracts the powder from the xerographic drum to the support material. The card is then carried by the conveyor 20 past a fuser 50 wherein the powder is caused to coalesce and bond to the surface of the card. Residual powder is removed from the drum surface by means of a brush cleaner 52 which rotates in contact with the surface of the drum.

Figure 3:
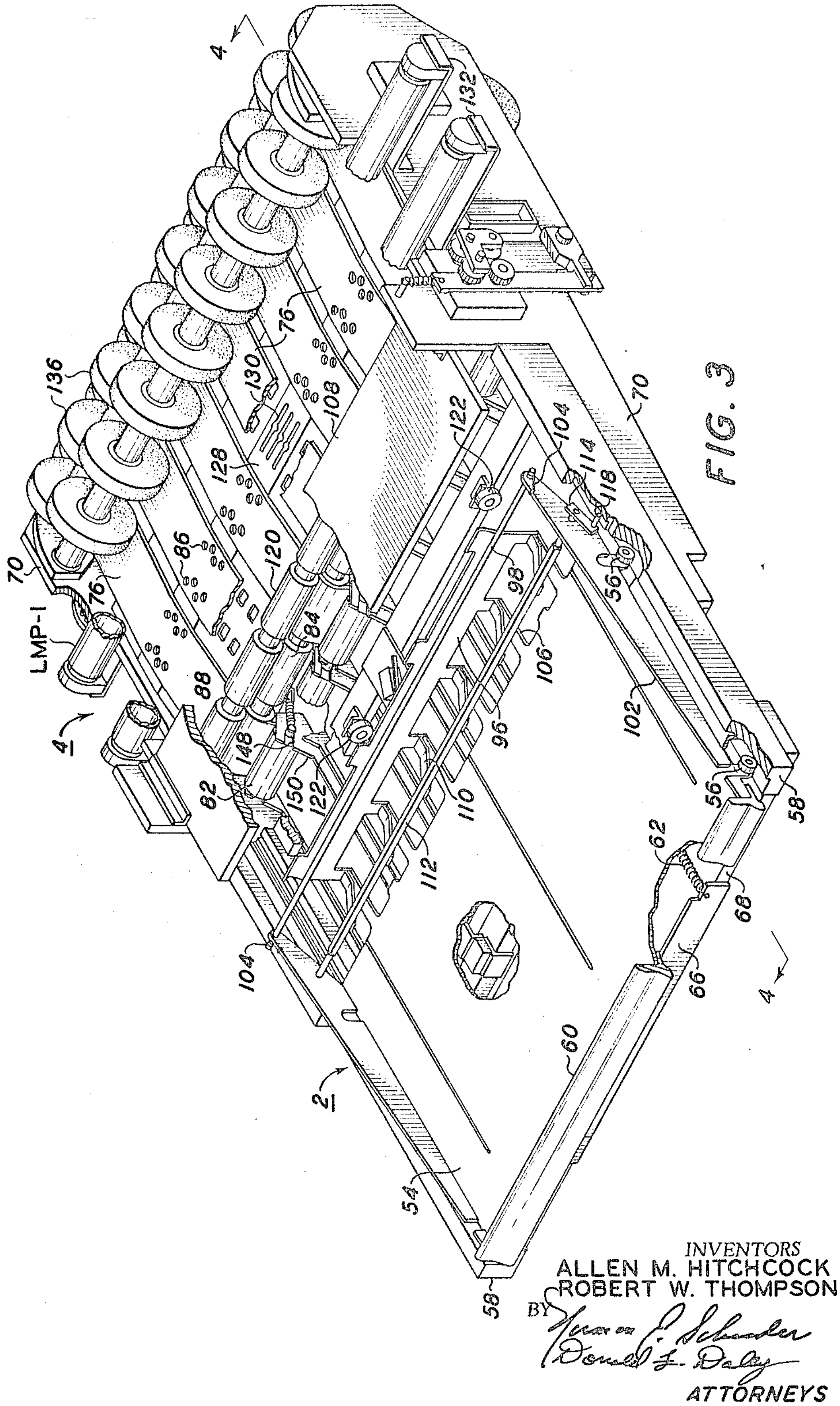
FIG. 3 is an isometric view of a document tray and document conveyor with parts broken away to show internal construction.
Figures 4, 5:
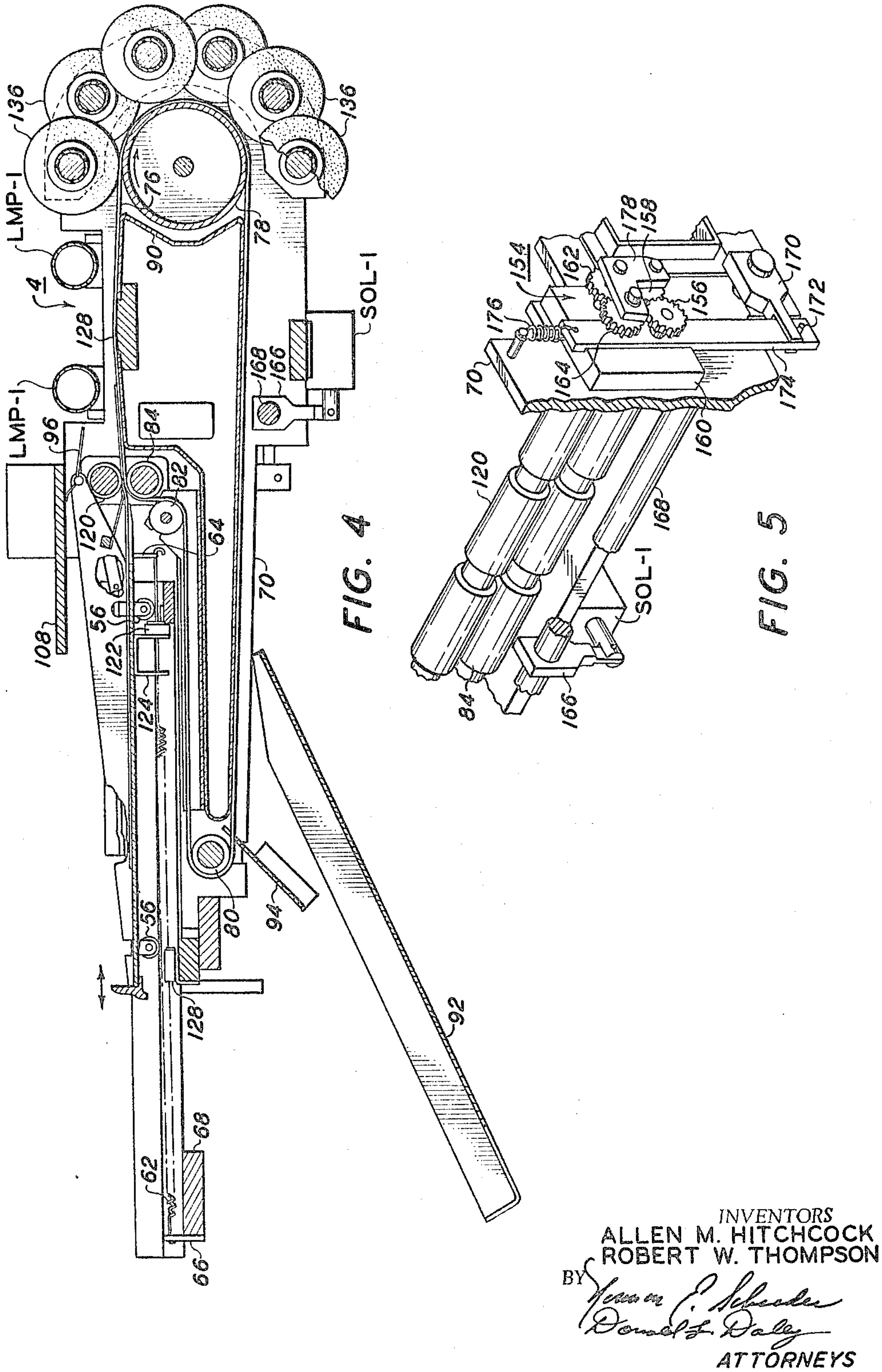
FIG. 4 is a side sectional view of the document tray and conveyor taken along lines 4—4 of FIG. 3.
FIG. 5 is an enlarged detailed view of the drive system for sheet feed roller of the conveyor shown in FIG. 3.

Enlarged detailed views of the document tray, document conveyor and scanning station are shown in FIGS. 3 and 5. The plate 54 of document tray 2 is adapted to hold two 8½ x 11 inch sheets, in the manner shown in FIG. 1, one 11 x 17 sheet with the 17 inch dimension across the tray and the 11 inch dimension extending in the direction of feeding, or any combination of smaller documents not exceeding 17 inches across the tray. The tray 2 is supported by rollers 56 from guide rails 58 located at one side of the tray. The guide rails 58 extend beyond the length of the tray 2 towards the scanning station 4 so that the tray may be moved forward on the rollers 56 towards the scanning station. An upwardly extending plate 60 is secured to the outer edge of the tray 2 so that an operator may push the plate 60 to advance the tray 2 towards the scanning station. The tray moves along the guide 58 on the rollers 56 against the action of a tension spring 62 secured between a bracket 64 on the bottom of the tray 2 and a plate member 66 secured to a cross-support member 68 between the two guide rails 58. The spring 62 provides the force necessary to return the document tray to its original or sheet-receiving position after the previous sheets have been fed from the document tray.

The pair of side frames 70 support the guide rails 58 and the document conveyor system. The side frames 70 are supported from the main frame of the machine and are spaced apart by a front cross-member 72 and a rear cross-member 74.

The conveyor system is journaled in the side frames 70 and consists of a series of perforated belts 76 which extend around a drive roll 78, a guide roller 80, a tensioning roll 82 and a guide roller 84. The belt strands 76 are all perforated with a series of small holes 86 which pass over a series of rectangular openings 88 in the top of a vacuum manifold 90. The vacuum manifold 90 is connected to a suitable exhaust system, not shown, and serves to hold documents in a flat position on the surface of the belt.

The vacuum manifold 90 has openings 88 on the top and bottom so that documents on the conveyor belts 76 will be held in position through the scanning station 4 and be carried down beneath the transport system to a discharge tray 92. The openings 86 in the bottom of manifold 90 extend only a short distance beyond the tray 92 so that the vacuum holding the documents on the belt is released at this point and the document is deflected downward by deflection plates 94 into the tray 92.

When the documents to be reproduced are placed on the document tray 2, the document tray is then moved forward on rollers 56 to the position shown in FIG. 5. In positioning the documents on the tray 2, the documents are pushed forward until they abut a positioning guide 96. The positioning guide 96 is secured to a rotatable rod 98 mounted in the tray side plates 102. A pair of torsion springs 104 on each end of the rods 98 bias the positioning guide 96 towards the document tray 2 so that the finger-like extensions of the guide plates 96 abut a series of finger-like extensions 106 at the front of the tray 2. As the tray 22 is moved forward to feed documents, the top of the positioning guide 96 encounters a cover plate 108 mounted between the side frames 70, above the document feeding station. The cover plate 108 interferes with the movement of guide plate 96 and causes the guide plate 96 to rotate against the action of springs 104 to the position shown in FIG. 5. In this position documents can be fed forward out of the document tray 2 without encountering the guide plates 96. At the same time a series of fingers 110, mounted on a rotatable shaft 112 journaled in the tray side plates 102, are forced downward pinching the document against the finger-like extensions 106. The downward force of the fingers 110 is accomplished simultaneously with the forward movement of the tray 22 by means of a crank arm 114, on the end of the shaft 112, and a pin 116 extending outward from the crank arm 114 and riding on a cammed or inclined surface 118 in the guide rail 58. The fingers 110 hold the documents in place after pivotal movement of the guide plate 96.

When the document tray 2, containing documents to be reproduced, is moved forward to the position shown in FIG. 5, the positioning guide 96 is deflected upwards and the fingers 110 are forced down holding the document in place. The finger-like extensions 106 extend into corresponding under-cut portions of belt roller 84. A sheet feed roller 120 mounted directly above the belt roller 84 and movable into and out of contact with the belt strands 76, as described below, is in an elevated position so that the documents on tray 2 extend between the feed roller 120 and the belts 76. When the feed roller 120 is lowered into contact with the document, forcing the document against the belts 76, the documents are carried by the belts forward past the scanning station 4. The document tray 2 is held in the forward or feed position by means of electro magnets 122 which contact a bracket 124 on the bottom of the document tray. After the documents have been fed, the electro magnets 122 release the document tray 2 which is returned to its original position by spring 62. The bracket 124 then contacts a permanent magnet 126 which holds the tray in the document receiving position until the previous document has cleared the feed roll.

The conveyor belts 76 are directed through a document flow path around rollers 78, 80, 82 and 84 and the surface of the vacuum manifold 90. The top of the manifold 90 guides the belts upward on a slight incline to a suitably curved surface 128 at the scanning station 4. At this point the manifold has a series of elongated openings 130 beneath the openings 86 in the belt strands to provide greater suction at the scanning station and hold the document to the desired curvature during scanning.

The illuminating lamps LMP–1 and lamp brackets 132 are supported from the side frames 70 on each side of the scanning station 4. As the document is carried past the scanning station 4, incremental areas across the document are successively illuminated by the lamps LMP–1 and an image of the document is reflected upward to mirror 30. Mirror 30 is mounted at a 45° angle, as seen in FIG. 2. The image is reflected from the mirror 30 to a second mirror 31 and then downward through a lens 108 to the surface of the xerographic drum 12. The image on the drum 12 is reduced to a size sufficient to be reproduced on a card.

After scanning, the document is carried by the belts 76 around the drive roll 78. As the document leaves the vacuum manifold 90, a deflection plate 134 deflects the document downward beneath a series of resilient discs 136. The resilient discs 136 are placed in surface contact with the drive roller 78. The resilient discs consist of a series of plastic foam rolls spaced across the width of the conveyor system and serve the purpose of guiding the documents around the drive roller 78. The discs hold the document against the surface of the roller 78 and guide it down beneath the vacuum manifold 90. As the documents emerge from contact with the discs 136, they are deflected back into contact with the belts 76 by means of a deflection plate 146. At this point openings in the vacuum manifold 90, similar to the openings 88 in the top of the manifold, produce a suction through the holes 86 in the belts and draw the document against the belt for continued transportation to the discharge tray 92. When the documents approach the end of the manifold 90, the leading edge of the documents pass the last of the openings 88 and the vacuum holding the documents on the belt no longer exists so that the document is deflected downward by the deflection plate 94 into the discharge tray 92.

The tensioning of the belts 76 is accomplished by the roller 82 which is rotatably supported in elongated slots 148 in a series of support plates 150. The shaft of the roller 82 is held in the slots 148 and is pressed against the belts 76 by means of a series of tension springs 152.

The document feed roller 120 is moved into and out of contact with the belts 76 to allow the documents to be fed into the belt beneath the feed roller 120. When the document tray 2 moves forward, the finger-like extensions 106 extend between the belts 76 so that the leading edge of the documents is in a position to be pressed onto the belts by the feed roller 120. As seen in FIG. 6, the feed roller 120 is driven from the shaft of roller 84 by means of gear train 154. A gear 156 is mounted on the end of the shaft of the roller 84 and meshes with an idler gear 158, rotatably secured to a stub shaft in slide block 160 mounted on the side frames 70. The gear 158 meshes with a similar idler 162 mounted on a stub shaft in a connector 178. Gear 162 drives a gear 164 mounted on the shaft of feed roller 120. The gears in gear train 154 are all the same size so that there is no increase or reduction in speed between the rollers 84 and 120. However, when the rollers are separated, the gears all continue to mesh so that the roller 120 is still rotated synchronously with the movement of the belts 76 even when separated from contact with the belts 76. The roller 120 is separated from the belts 76 by means of a solenoid SOL–1 which moves a crank arm 166, secured to shaft 168. The shaft 168 is rotated by the crank arm 166 and in turn rotates a second crank arm 170 secured on the end of shaft 168. The rotational movement of crank 170 presses downward on a pin 172 in a slide bar 174 riding in a groove in the slide block 160. The slide bar 174 is held upward against the action of the crank arm 170 by a spring 176 so that the normal position of the slide bar 174 is in an elevated position, as seen in FIG. 6, until it is forced downward by action of the solenoid SOL–1. The slide bar 174 has an elongated groove through which the shaft of roller 84 extends so that movement of the slide bar does not effect the rotational movement or the position of the roller 84. The shaft of roller 120 extends through an over-sized hole in the slide bar 174 so that the upward movement of the bar 174 raises the shaft of the roller 120. The shaft of roller 120 is pivotally pinned to the stub shaft of gears 154 and 158 by means of a connector member 178. Member 178 assures a constant positioning of gears 158, 162 and 164 relative to each other so that continuity of drive is maintained during movement of the roller 120. The over-sized hole in slide bar 174 compensates for the rotational effect produced by movement of gear 164 while the gear 158 remains stationary. An identical arrangement to the gear train 154, the crank arm 170 and slide bar 174 exists on the opposite side of the machine from that shown in the drawings. The shaft 168 extends through the side frame 70 on both sides of the machine to force the roller 120 down against the documents and the belts 76 uniformly across the width of the conveyor. The drive described assures synchronization between the movement of the roller 120 and the belts 76 and thus uniform feeding of the documents from the tray 2 to the scanning station 4.

While the invention has been described with reference to the structure disclosed herein, it is not confined to the details set forth, and this application is intended to cover such modifications or changes as may come within the purposes of the improvements of the scope of the following claims.

What is claimed is:

1. Document feeding apparatus for transmitting documents in proper alignment to a moving conveyor of the type having a plurality of spaced belts including a tray capable of holding a plurality of documents and having finger-like extensions aligned with the spaces between the belts of the conveyor, means to move the tray forward towards the conveyor system until the finger-like extensions extend between the belts of the conveyor, means to press the portions of the document on the tray between the finger-like extensions against the conveyor belts when the tray is moved forward thereby feeding documents onto the conveyor system, and means to return the tray to its original position after the documents have been fed onto the conveyor system.

2. Document feeding apparatus for transmitting documents in proper alignment to a moving belt conveyor having a series of spaced belts including a document tray positioned at one end of a conveyor and adapted to hold a plurality of documents and having guides to align the documents in desired positions on the surface of the tray, said tray being movably mounted on a pair of side rails whereby the tray may move from a document receiving position to a document feeding position, the portion of the document tray extending in the direction of the conveyor system having undercut portions and finger-like extensions which extend between the belts of the conveyor system when the tray is moved to the document feeding position, and means to press the document against the conveyor belt in the undercut portions of the tray to feed the document from the tray onto the conveyor system, and means to return the tray to the original position.

3. Document feeding apparatus for transmitting documents in proper alignment to a moving conveyor of the type having a plurality of spaced belts including a tray capable of holding a plurality of documents and having finger-like extensions aligned with the spaces between the belts of the conveyor, means to move the tray forward toward the conveyor system until the finger-like extensions extend between the belts of the conveyor, guide means to position the documents on the tray, document holding means adapted to maintain the documents in position on the tray during tray movement, means to press the portions of the document on the tray between the finger-like extensions against the conveyor belts when the tray is moved forward thereby feeding documents onto the conveyor system, and means to return the tray to its original position after the documents have been fed onto the conveyor system.

4. Document feeding apparatus for transmitting documents in proper alignment to a moving conveyor of the type having a plurality of spaced belts including a tray capable of holding a plurality of documents and having finger-like extensions aligned with the spaces between the belts of the conveyor, means to move the tray forward towards the conveyor system until the finger-like extensions extend between the belts of the conveyor, guide means to position the documents on the tray, means to deflect the guide means away from the documents on the tray when the tray is moved forward, document holding means adapted to maintain the documents in position on the tray when the guide means are deflected away from the documents, means to maintain the document holding means away from the document prior to movement of the tray and to press the holding means against the documents as the tray is moved forward, means to press the portions of the document on the tray between the finger-like extensions against the conveyor belts when the tray is moved forward thereby feeding documents onto the conveyor system, and means to return the tray to its original position after the documents have been fed onto the conveyor system.

References Cited by the Examiner

UNITED STATES PATENTS

| | | | |
|---|---|---|---|
| 3,090,616 | 5/1963 | Eichler et al. | 271—3 |
| 3,100,112 | 8/1963 | Davis et al. | 271—3 X |

EVON C. BLUNK, *Primary Examiner.*

A. C. HODGSON, *Assistant Examiner.*